US008989731B1

(12) United States Patent
Abou-El-Ella et al.

(10) Patent No.: US 8,989,731 B1
(45) Date of Patent: Mar. 24, 2015

(54) DETECTION AND SELF-HEALING OF A MOBILE COMMUNICATION DEVICE NETWORK ACCESS FAILURE

(71) Applicant: Sprint Communications Company L.P., Overland Park, KS (US)

(72) Inventors: Hassan Abou-El-Ella, Overland Park, KS (US); John D. Sumler, Bonner Springs, KS (US); Robert E. Urbanek, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 134 days.

(21) Appl. No.: 13/855,677

(22) Filed: Apr. 2, 2013

(51) Int. Cl.
*H04W 24/00* (2009.01)
*H04W 24/04* (2009.01)

(52) U.S. Cl.
CPC .................................... *H04W 24/04* (2013.01)
USPC ............................ 455/423; 455/436; 370/216

(58) Field of Classification Search
None
See application file for complete search history.

(56) References Cited

U.S. PATENT DOCUMENTS

2008/0118069 A1* 5/2008 Yang ............................ 380/279
2010/0035599 A1 2/2010 Chen
2013/0078948 A1 3/2013 Pecen et al.
2013/0142052 A1* 6/2013 Burbidge et al. ............ 370/242
2013/0322230 A1* 12/2013 Shaik et al. .................. 370/216
2014/0215081 A1* 7/2014 Cili et al. ...................... 709/227
2014/0235232 A1* 8/2014 Lee et al. ...................... 455/423
2014/0241169 A1* 8/2014 Collins et al. ................ 370/242

OTHER PUBLICATIONS

Abou-El-Ella, Hassan, et al., Patent Application entitled "Limit Failed Network Connection Attempts with Factory Default Settings", filed on Apr. 2, 2013, U.S. Appl. No. 13/855,684.
Pre-Interview Communication dated Oct. 17, 2014, U.S. Appl. No. 13/855,684, filed Apr. 2, 2013.
Notice of Allowance dated Dec. 23, 2014, U.S. Appl. No. 13/855,684, filed Apr. 2, 2013.

* cited by examiner

*Primary Examiner* — Olumide T Ajibade Akonai
*Assistant Examiner* — Margaret G Mastrodonato

(57) ABSTRACT

A method of responding to a network connection failure in a mobile communication device. The method comprises receiving an error message indicating a data connection failure, activating an application configured to attempt to access the network using a first identifier on the mobile communication device in response to receiving the error message, sending an SMS message from the mobile communication device over an SMS control channel in an attempt to access the network, receiving information indicating a failure to access the network through the SMS control channel, determining that the failure to access the network is based on the first identifier, performing a limited reset of the mobile communication device to replace the first identifier with a factory default identifier, confirming through use of the factory default identifier that the first identifier is inactive, and establishing the factory default identifier such that the mobile communication device is configured for activation.

13 Claims, 9 Drawing Sheets

300
Start
305 Receive, by a mobile communication device, an error message indicating a data connection failure.
310 Activate an application on the mobile communication device in response to receiving the error message.
315 Send an SMS message from the mobile communication device in an attempt to access the network.
320 Receive, by the mobile communication device, information indicating failure to access the network through SMS.
325 Determine that a first identifier failed to access the network.
330 Store the first identifier in a persistent data store.
335 Perform a limited reset of the mobile communication device wherein the first identifier is replaced by a factory default identifier.
340 Confirm that the first identifier is inactive.
345 Delete the stored first identifier from the persistent data store.
350 Establish the factory default identifier such that the mobile communication device is configured for activation.
End

DETECTION AND SELF-HEALING OF A MOBILE COMMUNICATION DEVICE NETWORK ACCESS FAILURE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication based on network connectivity provided by base stations known as cell towers or sites. In addition to the standard voice function of a mobile telephone, current mobile phones and other similar portable electronic devices may support additional services including short message service (SMS) for text messaging, electronic mail, and packet switching for access to the Internet. When a problem occurs with a mobile telephone, the user may drive to a local retail location to receive service on the device. Alternatively, the user may work with a customer care organization of the communication service provider. The user may provide information and manually troubleshoot the problem themselves based on directions given by the customer care agent.

SUMMARY

In an embodiment, a method of responding to a network connection failure in a mobile communication device is disclosed. The method comprises receiving, by the mobile communication device, an error message indicating a data connection failure, activating an application on the mobile communication device in response to receiving the error message, wherein the application is configured to attempt to access the network using a first identifier, sending, by the application, an SMS message from the mobile communication device over an SMS control channel in an attempt to access the network, receiving, by the mobile communication device, information indicating a failure to access the network through the SMS control channel, determining, by the mobile communication device, that the failure to access the network is based on the first identifier, performing a limited reset of the mobile communication device, wherein the first identifier on the mobile communication device is replaced with a factory default identifier, confirming, through use of the factory default identifier, that the first identifier is inactive, and establishing the factory default identifier such that the mobile communication device is configured for activation.

In an embodiment, a method of responding to a network connection failure in a mobile communication device is disclosed. The method comprises receiving, by a mobile communication device, an error message indicating a network connection failure, activating an application on the mobile communication device, wherein the application is configured to attempt to access the network, determining, at the mobile communication device, that a first identifier failed to access the network based on the first identifier, storing the first identifier in a persistent data store, performing a limited reset, wherein the first identifier on the mobile communication device is replaced with a factory default identifier, attempting to access the network with the factory default identifier, obtaining access to the network using the factory default identifier, verifying that the first identifier is active based on obtaining access to the network, and re-establishing the first identifier from the persistent data store.

In an embodiment, a method of establishing viable credentials in a mobile communication device is disclosed. The method comprises attempting to access a network with a set of data credentials, failing to access the network with the set of data credentials, receiving, at a mobile communication device, an error message in response to failing to access the network with the set of data credentials, activating an application on the mobile communication device, wherein the application is configured to send a casual message over a control channel, sending the casual message over the control channel, receiving, at the mobile communication device, confirmation that the casual message was successfully sent in response to sending the casual message, and establishing viable credentials using the control channel.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
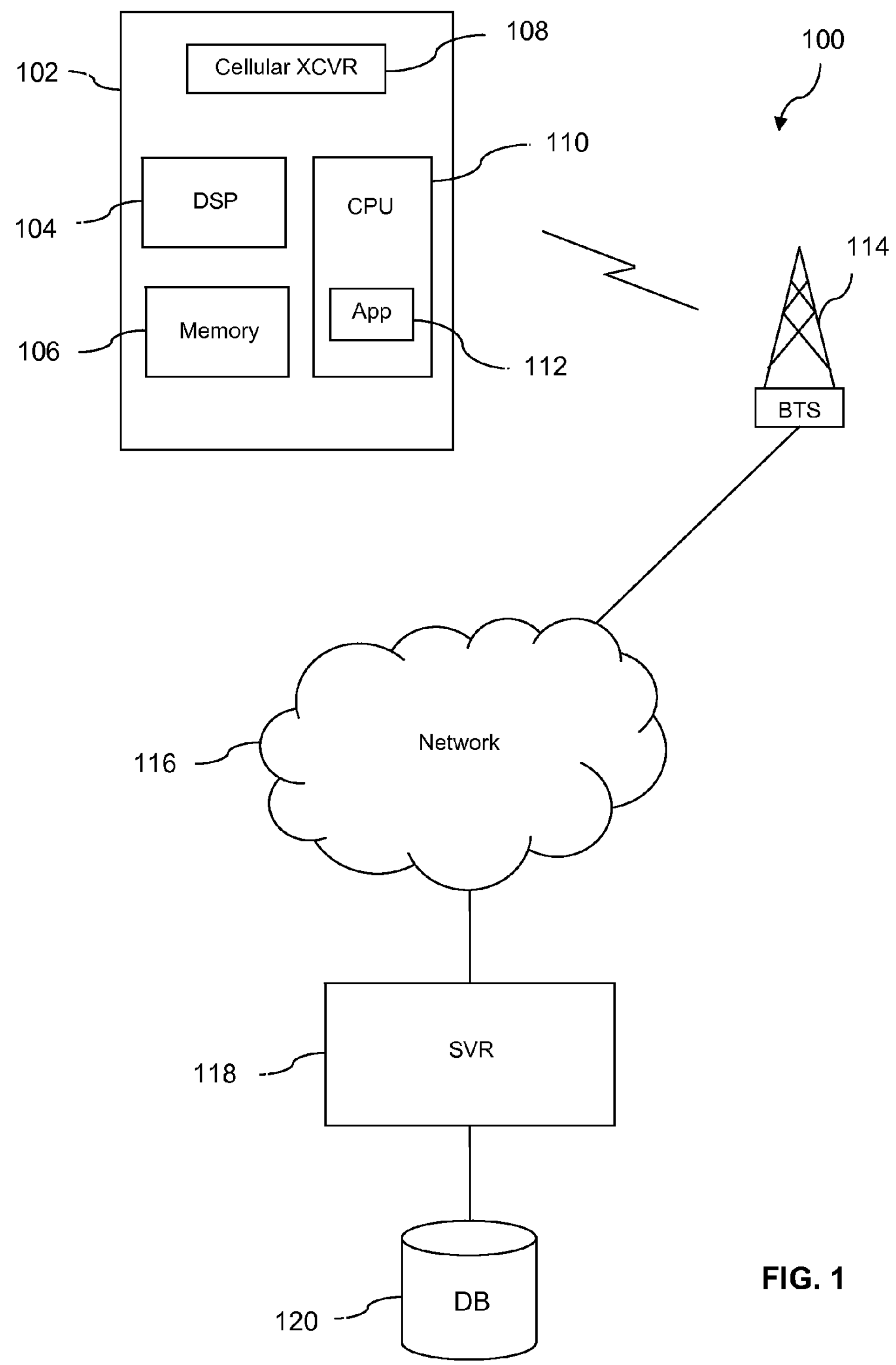
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A mobile communication device, such as a mobile phone or smart phone, may be used to place voice calls, to send short message service (SMS) messages, to access the internet, to check or send electronic mail, or to serve other communication purposes. The mobile communication device may access a network in order to perform certain tasks. It may be the case that the mobile communication device is unable to access the network thereby receiving an error message. Inability to access the network may be caused by an invalid credential, malware, an invalid identifier, heavy network traffic, or it may be caused for some other reason.

The present disclosure teaches responding to the mobile communication device's inability to access the network by sending an SMS message over an SMS control channel. In an embodiment, the mobile communication device may comprise an application configured to execute upon receiving an input from a user and/or upon receiving an error message indicating that the mobile communication device experienced a network connection failure. The application may proceed by sending an SMS message over an SMS control channel. If the SMS message is successful, then the mobile communication device may be failing to access the network due to an invalid parameter. In an embodiment, attempting to resynchronize the parameter through SMS messaging over the SMS control channel is taught. Once it is determined that there may be an invalid parameter, resynchronizing the parameter may be attempted by using SMS messaging to access a data store connected to a server.

If the SMS message is unsuccessful, then there may be a problem with a user identifier. The present disclosure teaches performing a limited reset by way of a modem reboot in order to test the user identifier activity. In an embodiment, the application may back up the user identifier on a persistent data store then perform the limited reset in order to restore a factory default identifier. The factory default identifier may then be used to test the user identifier activity. If the user identifier is active, then the application may restore the user identifier. If the user identifier is inactive, then the application may leave the factory default identifier as the identifier of the mobile communication device and prompt a user with activation instructions.

It is expected that resynchronizing credentials using SMS messaging may improve convenience for the user by potentially reducing the amount of time the user spends interacting with customer service. Similarly, it is expected that establishing the factory default identifier once the user identifier has been confirmed to be inactive may improve convenience for the user by potentially reducing the amount of time the user spends interacting with customer service. In the case that network access is denied, SMS messaging fails, and it is determined that the user identifier is active, the user identifier may be restored which may prevent undesirable deletion of user data.

Turning now to FIG. 1, a communication system 100 is described. In an embodiment, the system 100 comprises a mobile communication device 102, a base transceiver station (BTS) 114, a network 116, a server (SVR) 118, and a data store (DB) 120. In an embodiment, the mobile communication device 102 comprises a digital signal processor (DSP) 104, a memory 106, a cellular transceiver (XCVR) 108, a processor (CPU) 110, and an application 112. In an embodiment, the mobile communication device 102 may comprise an ankle monitor configured to send a radio frequency signal to a receiver. The radio frequency signal may comprise information about the geographic location of the ankle monitor at the time the signal was sent. In an embodiment, the mobile communication device 102 may comprise a mobile phone, a personal digital assistant (PDA), a media player, a laptop computer, a notebook computer, a tablet computer, a pager, a personal navigation assistant, a wireless access card, a smart phone, a feature phone, a device that uses machine-to-machine (M2M) communication, a mobile communication device lacking a user interface, a mobile communication device lacking components for user input, or another mobile device. In another embodiment, the teachings of the present disclosure may apply to communication devices that are substantially stationary, for example a smart meter that may be configured to monitor, track, record, and/or transmit a report or digest of electricity usage or other consumption of a utility, for example to a reader device or to the base transceiver station 114.

The network 116 may comprise one or more local area networks, one or more wireless local area networks, one or more wide area networks, one or more metropolitan area networks, one or more server area networks, one or more cluster area networks, one or more personal area networks, one or more desk area networks, one or more home area networks, one or more backbone networks, one or more enterprise private networks, one or more virtual networks, one or more private networks, one or more public networks, or combinations thereof. It is understood that the communication system 100 may comprise a plurality of base transceiver stations 114, a plurality of servers 118, a plurality of data stores 120, or combinations thereof.

In an embodiment, the mobile communication device 102 may operate the cellular transceiver 108 to make voice and/or data calls via the base transceiver station 114 and the network 116. The cellular transceiver 108 may communicate with the base transceiver station 114 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The cellular transceiver 108 may be conducting wireless communication handshaking even when not making voice and/or data calls.

In an embodiment, the mobile communication device 102 may operate the cellular transceiver 108 to access the network 116 through the base transceiver station 114 in order to access information in the data store 120 contained on the server 118. In an embodiment, the information contained in the data store 120 may comprise a parameter, a user credential, a factory default credential, a factory default state, a user identifier, a factory default identifier, user account information, an MEID, service provider information, or it may comprise some other information. The parameter, credential, or identifier stored in the data store 120 may play a role in the wireless handshaking between the base transceiver station 114 and the cellular transceiver 108. For example, the cellular transceiver 108 may send user identification data and location data to the base transceiver station 114, which may be in communication with a register stored on a server associated with a network service provider. The network service provider server, through the base transceiver station 114, may then associate the user identification data with an active subscription and use location data to instruct a wireless handoff when the mobile communication device 102 moves into a different service cell.

In an embodiment, there may be a forward link and a reverse link used by the cellular transceiver 108 to communicate with the base transceiver station 114. The forward link may comprise a plurality of forward channels. The forward link may comprise a pilot channel, a sync channel, an access control channel, a system broadcast information channel, a plurality of paging channels, and a plurality of traffic channels. Casual messages may be sent over one or more of the paging channels, the access control channel, and/or over one or more of the traffic channels. Casual messages may be short messages less than about 100 kilobytes, less than about 10 kilobytes, less than about 1 kilobyte, or short messages of some other relatively small size. Casual messages may be best effort messages without a guaranteed delivery time and without a service level agreement. Casual messages may be sent over shared communication bandwidth on a non-dedicated radio channel, a control channel, or on another shared channel. In an embodiment, an SMS message may be a casual message. It should be understood that while the systems and methods described herein will be discussed as using SMS messaging, it is contemplated that the teachings of the present disclosure may be implemented based on using casual messaging other than SMS messaging.

In an embodiment, there may be a plurality of voice channels and a plurality of control channels through which the cellular transceiver 108 may attempt to access the network 116. The plurality of voice channels may be used to place voice calls, and in some circumstances, voice channels may be used for data communication. The plurality of control channels may be used for data communication and SMS messaging. The mobile communication device 102 may use control channels to exchange location area identity information, authentication information, cell frequency information, and/or other information with the base transceiver station 114. The control channel comprises three subtypes of control channels: broadcast control channels, common control channels, and dedicated control channels. Dedicated control channels are made up of eight stand-alone dedicated control channels. Stand-alone dedicated control channels may be used for short transactions including SMS messaging. In an embodiment, an SMS control channel may refer to the stand-alone dedicated control channel. In some contexts, an SMS control channel may refer to a paging channel, an access control channel, and/or a traffic channel as described hereinabove.

In an embodiment, the processor 110 may be configured to activate the application 112 upon receiving an error message indicating that the mobile communication device 102 failed to access the network 116. The error message may be a data connection failure message, such as an error 67 message, or some other error message. In some cases, the mobile communication device 102 may fail to access the network 116 due to an invalid data credential. The application 112 may direct the mobile communication device 102 to operate the cellular transceiver 108 to send an SMS message via the SMS control channel. In an embodiment, the SMS message may contain information about the mobile communication device 102, or the SMS message may be a blank message. The SMS message may be sent to the mobile communication device 102 or to some other location. In an embodiment, the SMS control channel may be a voice channel, an SMS specific channel, or another suitable channel. If the SMS message is sent successfully, then the application 112 may operate the cellular transceiver 108 to access the data store 120 through the SMS control channel in an attempt to resynchronize the invalid data credential.

In an embodiment in which the SMS message fails, the application 112 may direct an extant user identifier to be stored in a persistent data store. The extant user identifier may be a user credential, user account information, an MEID, user data, service plan information, or some other identifier ascribed to a user. In an embodiment, the persistent data store may comprise the data store 120, the memory 106, some other storage medium, or combinations thereof.

After the extant user identifier has been stored in the persistent data store, the application 112 may direct the mobile communication device 102 to perform a limited reset. In some contexts, a limited reset may be referred to as a partial reset, a limited factory reset, an SCRTN reset, a modem reboot, or a modem reset. For the purposes of this disclosure it will be referred to hereinafter as a limited reset. In an embodiment, performing the limited reset may comprise resetting the digital signal processor 104 and allowing the application 112 to continue to execute after the user identifier has been replaced with a factory default identifier. The application 112 may be stored on the processor 110 which may be unaffected by resetting the digital signal processor 104 and/or the modem it provides.

In an embodiment, the mobile communication device 102 may restore the factory default identifier in response to the limited reset. The mobile communication device 102 may have the factory default identifier saved on the memory 106, saved in the persistent data store, and/or saved in another location configured to allow the factory default identifier to be restored after performing the limited reset. The factory default identifier may be a factory default credential, a first time credential applied by a manufacturer, a first time identifier applied by a manufacturer, a first time credential applied by a service provider, or a credential that allows limited network access.

After performing the limited reset, the application 112 may prompt the mobile communication device 102 to attempt to determine whether or not the user identifier is active. In an embodiment, the mobile communication device 102 may use the factory default identifier to gain limited access to the network 116, the server 118, and/or the data store 120 in order to investigate the state of the user identifier. In the case that the user identifier is active, the application 112 may direct the retrieval of the user identifier from the persistent data store as well as the reapplication of the user identifier.

In the case that the user identifier is inactive, the application 112 may direct the deletion of the user identifier from the persistent data store and further direct the establishment of the factory default identifier and/or a factory default state. The factory default state and/or identifier may be the original state and/or identifier of the mobile communication device 102 when it was manufactured. After the user identifier has been removed from the persistent data store, the mobile communication device 102 may be referred to as a cold device. A cold device may be considered to be a device which lacks a user profile and is ready for activation. As a cold device, the mobile communication device 102 may prompt a user with activation instructions.

Figure 2:
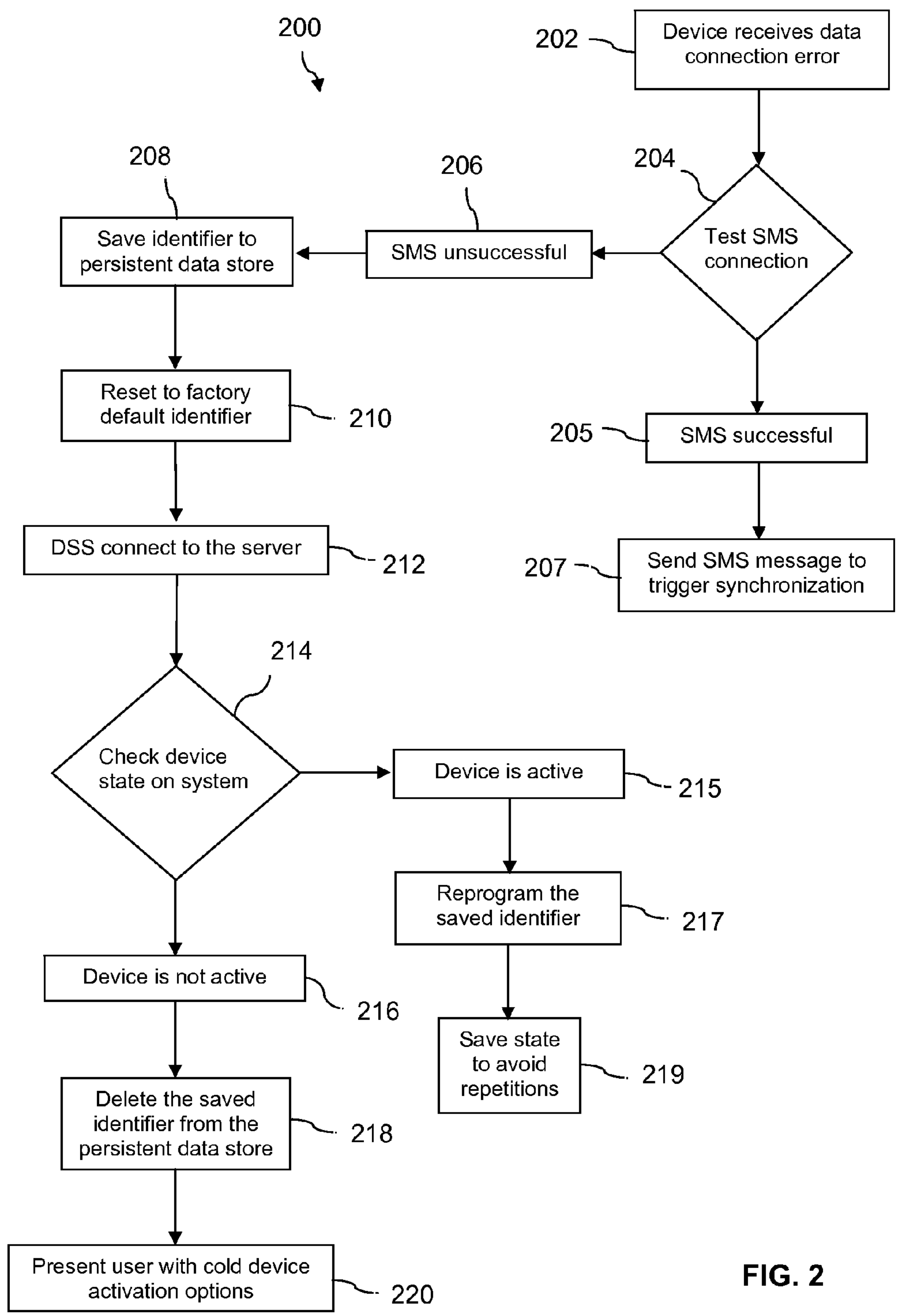
FIG. 2 is a flowchart of a method according to an embodiment of the disclosure.

Turning now to FIG. 2, a method 200 is described. The method 200 may be implemented in a mobile communication device such as a mobile phone, a smart phone, a wireless handset, a pager, a personal digital assistant (PDA), a gaming device, or a media player. The method begins at block 202. At block 202, a device may receive a data connection error. In an embodiment, receiving the data connection error may activate an application configured to respond to the data connection error. At block 204, an SMS connection may be tested. In an embodiment, testing the SMS connection may comprise sending an SMS message over an SMS control channel from the device to a server associated with a network provider. At block 205, a determination that the SMS message was successful may be made. In an embodiment, the SMS connection may be said to be active and the SMS message said to be successful if the SMS message reaches its destination. In some cases, the device may receive an indication, a success message, or other confirmation that the SMS message reached its destination. At block 207, the active SMS connection may be used to resynchronize parameters. The device may have failed to establish the data connection because user information carried by the device did not match up with user information stored in on the network side. The SMS connection may be used to attempt resynchronize this information in order to give the device increased network connectivity. The information and/or parameter being resynchronized may comprise user account information, server information, network information, a user credential, a user identifier, a network credential, a data credential, service provider information, and/or some other information. Using the active SMS connection to resynchronize parameters may comprise sending SMS messages over the active SMS connection in an attempt to synchronize user credentials and data credentials.

In an embodiment, resynchronizing parameters may comprise updating user and/or data credentials, assigning new credentials, or it may comprise another form of establishing cooperation between the device and a network. In an embodiment, attempting resynchronization may comprise using SMS messaging to access, via the network, a server data store containing user information. SMS resynchronization may comprise establishing viable credentials through communications with an external agent over the SMS control channel. Resynchronization may allow the device to self-correct and regain access to the network without assistance from customer care. Allowing the device to self-correct through resynchronization may improve convenience for a user of the device and may save the user time and energy that would otherwise be spent interacting with customer care.

In an embodiment, the SMS message may be unsuccessful at block 206. The device may be configured to remain connected to the SMS control channel in order to receive a return message indicating the success or failure of the SMS message. In an embodiment, the SMS message may be determined to be unsuccessful and the SMS connection to be inactive upon receipt of an error message, an indication that the SMS message did not reach its destination, and/or an indication that the SMS message did not send. Additionally, the SMS message may be determined to be unsuccessful after a period of time with no response (e.g. a time out). If the SMS message fails, the device may receive a return message indicating the failure and providing further instructions. The instructions may be to power off, to disable a cellular transceiver of the device, to blow fuses, or to perform some other action.

At block 208, an extant user identifier may be saved to a persistent data store. In an embodiment, the extant user identifier may be substantially similar to the extant user identifier described above with reference to FIG. 1. The persistent data store may be a data store located on a server, it may be a data store on the device, or it may be some other data store. At block 210, the device may be reset such that a factory default identifier is used as the identifier for the device. The factory default identifier may be substantially similar to the factory default identifier described above with reference to FIG. 1.

In an embodiment, resetting to the factory default identifier may comprise performing a limited reset as described above with reference to FIG. 1. At block 212, a device self-service (DSS) application may be used to connect the device to a server. Device self-service may refer to activities performed by the device without direct user input. In an embodiment, connecting to the server may be accomplished through use of the factory default identifier to gain limited network access. Limited network access may refer to a controlled, definable access (e.g., a walled garden type access).

At block 214, the network status of the device may be checked and/or verified. In an embodiment, checking the network status of the device may comprise steps substantially similar to those discussed in investigating the activity of the user identifier with reference to FIG. 1. At block 215, the device may be determined to be active. In an embodiment, determining that the device is active may comprise determining that the extant user identifier is active. At block 217, the extant user identifier may be reinstated or restored. In an embodiment, the extant user identifier may be reinstated or restored on the device in order to leave the device as is in the case that the reason for data connection failure remains unresolved or undetermined. At block 219, a save state may be applied to prevent repetition of the method discussed above with reference to the method 200. In an embodiment, a save state may comprise shutting off the application, storing the operating parameters, freezing the device's activities, and/or it may comprise some other form of preventing the repetition of the method discussed above in reference to the method 200.

At block 216, the device may be determined to be inactive. In an embodiment, determining that the device is inactive may comprise determining that the extant user identifier is inactive. At block 218, the stored extant user identifier may be deleted from the persistent storage. At block 220, a user may be presented with cold device activation options. Returning the device to the state of a cold device through device self-service may reduce interaction with customer service thereby improving convenience for the user of the device.

In an embodiment, the device may be returned to a factory default state in response to determining that the stored extant user identifier is inactive. In some contexts, the device may be considered to be in the factory default state when it operates under factory settings, is un-provisioned, and/or has no user information stored in memory. The factory default state may comprise a factory default setting, wherein the factory default setting is configured to limit the device from attempting to access a network in the factory default state without first receiving activation instructions from an authorized activation application. For further details about the factory default setting configured to limit the device from attempting to access a network described hereinabove, see U.S. patent application Ser. No. 13/855,684, filed Apr. 2, 2013, entitled "Limit Failed Network Connection Attempts with Factory Default Settings," by Hassan Abou-El-Ella, et al., which is hereby incorporated by reference in its entirety.

In an embodiment, the method 200 may be implemented in the case of a recycled device. A user may replace his/her mobile communication device with another mobile communication device. The replaced mobile communication device mentioned above will be hereinafter referred to as the first mobile communication device, and the mobile communication device replacing it will hereinafter be referred to as the second mobile communication device. Once the user provisions the second mobile communication device, the first mobile communication device will become a recycled device. The recycled device may be handed down to a family member, it may be kept for access to items stored on a memory of the recycled device, it may be used for Wi-Fi access, it may be used for gaming, or the recycled device may be used for a different purpose. The recycled device may be unable to make a data connection with a network. The method 200 may allow the device to either self-correct or to return to a factory default state. In the case of a recycled device, the method 200 may improve convenience for the user by reducing the time spent interacting with customer service.

Figure 3:
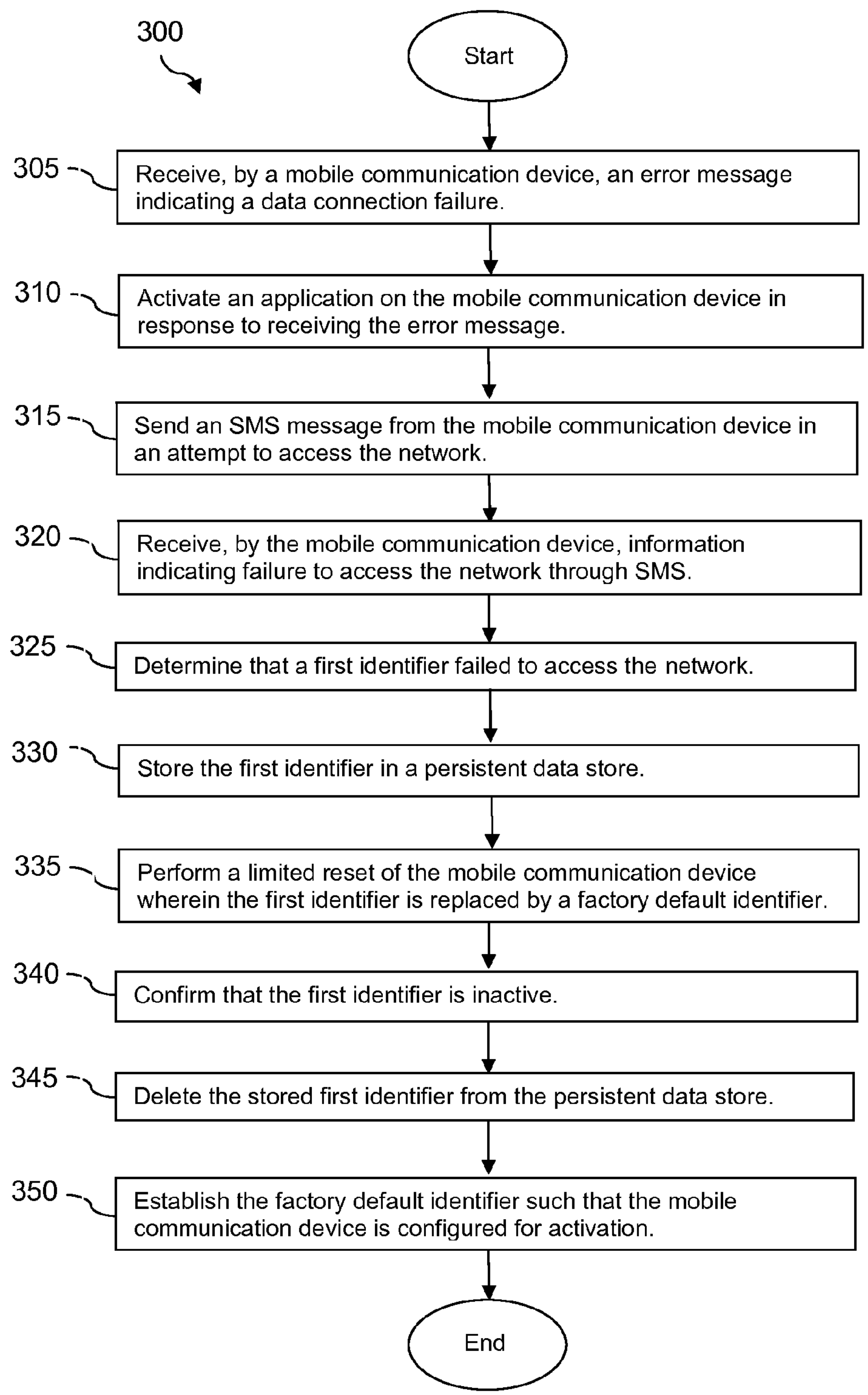
FIG. 3 is a flowchart of a method according to an embodiment of the disclosure.

Turning now to FIG. 3, a method 300 is described. At block 305, a mobile communication device may receive an error message indicating that the mobile communication device experienced a data connection failure. At block 310, an application that is configured to attempt to access a network in response to receiving the error message may be activated on the mobile communication device. In an embodiment, the application may attempt to access the network via an SMS control channel. At block 315, an SMS message may be sent from the mobile communication device in an attempt to access the network. At block 320, the mobile communication device may receive information indicating failure to access the network through SMS. Failure to access the network through SMS may comprise failing to access the network through the SMS control channel. Failing to access the network through the SMS control channel may be determined as described above with reference to FIG. 2. At block 325, it may be determined that the failure to access the network is based on the first identifier. The first identifier may be a user identifier, a user credential, or it may be another identifier. In an embodiment, determining that the failure to access the network is based on the first identifier may comprise identifying that the first identifier is being used rather than a factory identifier.

At block 330, the first identifier may be stored in a persistent data store. In an embodiment, storing the first identifier in the persistent data store may comprise steps substantially similar to those discussed above with reference to FIG. 1 and FIG. 2. At block 335, a limited reset of the mobile communication device may be performed, wherein the first identifier is replaced by a factory default identifier. In an embodiment, the limited reset, the first identifier, and the factory default identifier may each be substantially similar to the corresponding limited reset, the user identifier, and the factory default identifier described above with reference to FIG. 1. At block 340, it may be confirmed that the first identifier is inactive. In an embodiment, confirming that the first identifier is inactive may comprise determining that the first identifier is not attributed to a valid subscription, that the first identifier is corrupted, and/or that the first identifier is unable to access the network. At block 345, the stored first identifier may be deleted from the persistent data store. At block 350, the factory default identifier may be established as the identifier on the mobile communication device such that the mobile communication device is configured for activation. In an embodiment, establishing the factory default identifier such that the mobile communication device is configured for activation may comprise rendering the mobile communication device a cold device wherein the cold device may prompt a user with activation instructions.

Figure 4:
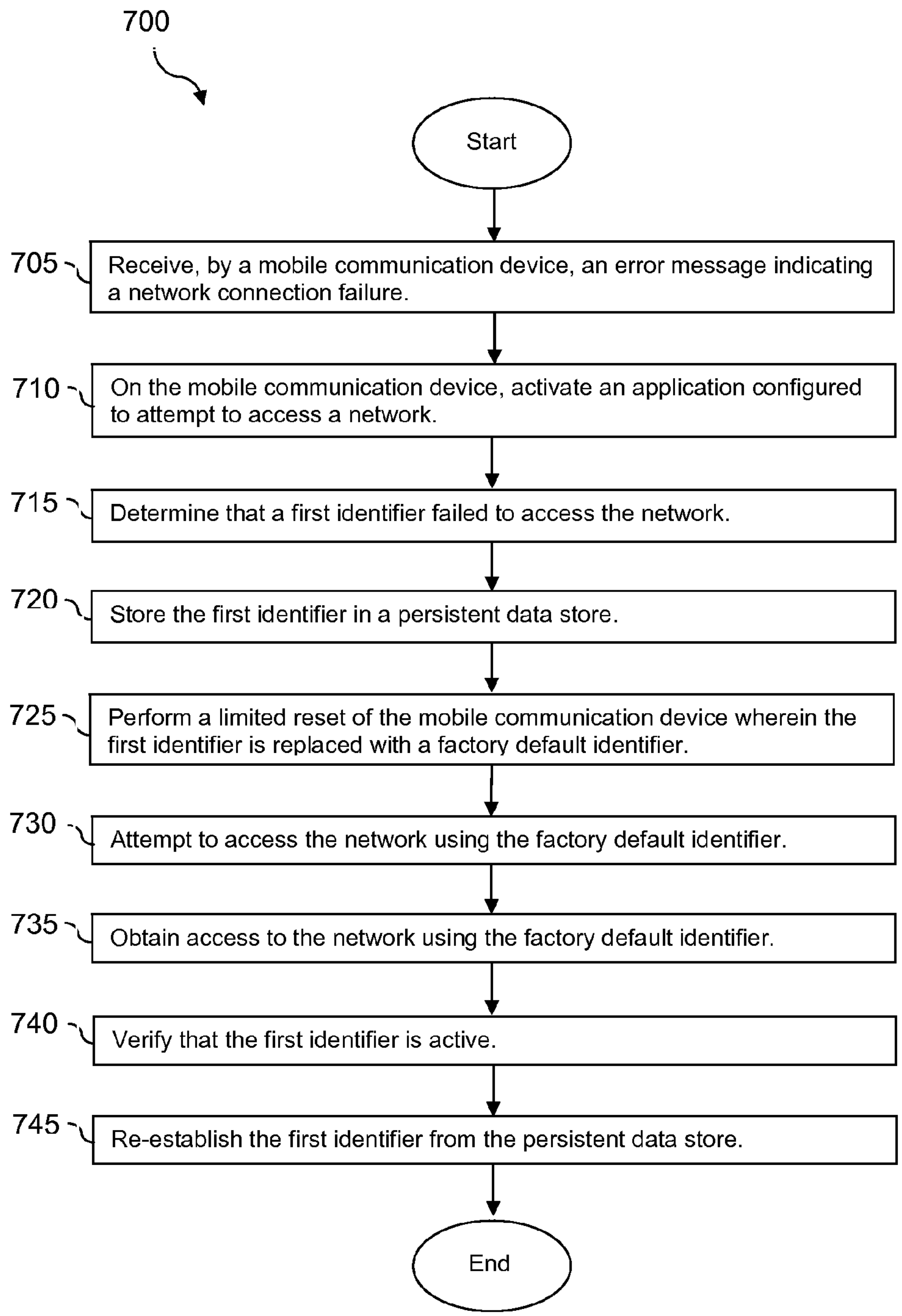
FIG. 4 is a flowchart of a method according to an embodiment of the disclosure.

Turning now to FIG. 4, a method 700 is described. At block 705, a mobile communication device may receive an error message indicating a network connection failure. In an embodiment, the error message may be an error 67 message, an error message configured to indicate data connection failure, and/or the error message may be another message configured to indicate a network connection failure. At block 710, an application may be activated on the mobile communication device that is configured to attempt to access the network. In an embodiment, the application may be configured to be activated in response to at least one of the receipt of the error message or receipt of an input from a user. At block 715, the cause of the failure to access the network may be determined to have resulted, at least in part, from the first identifier. In an embodiment, determining that a first identifier failed to access the network may comprise steps substantially similar to those described with reference to FIG. 3 above. At block 720, the first identifier may be stored in a persistent data store. At block 725, a limited reset of the mobile communication device may be performed, where the first identifier can be replaced with a factory default identifier. At block 730, accessing the network may be attempted using the factory default identifier. In an embodiment, attempting to access the network using the factory default identifier may comprise attempting to send an SMS message over an SMS control channel, attempting to send an SMS message over a voice channel, using factory default credentials to attempt to access a data channel, and/or another use of the factory default identifier to attempt to access the network.

At block 735, access to the network can be obtained using the factory default identifier. In an embodiment, network access may be considered to be obtained if the SMS message was successfully sent, if a data connection was successfully made, or if the network was otherwise accessed. At block 740, the first identifier may be verified as being active. In an embodiment, verifying and/or otherwise determining the activity of the first identifier or some user credential may comprise using the factory default identifier to access information relating to the first identifier or the some user credential over the network. This information may be stored in a data store associated with a server or it may be stored in another location accessible via the network. At block 745, the first identifier may be re-established or restored from the persistent data store.

Figure 5:
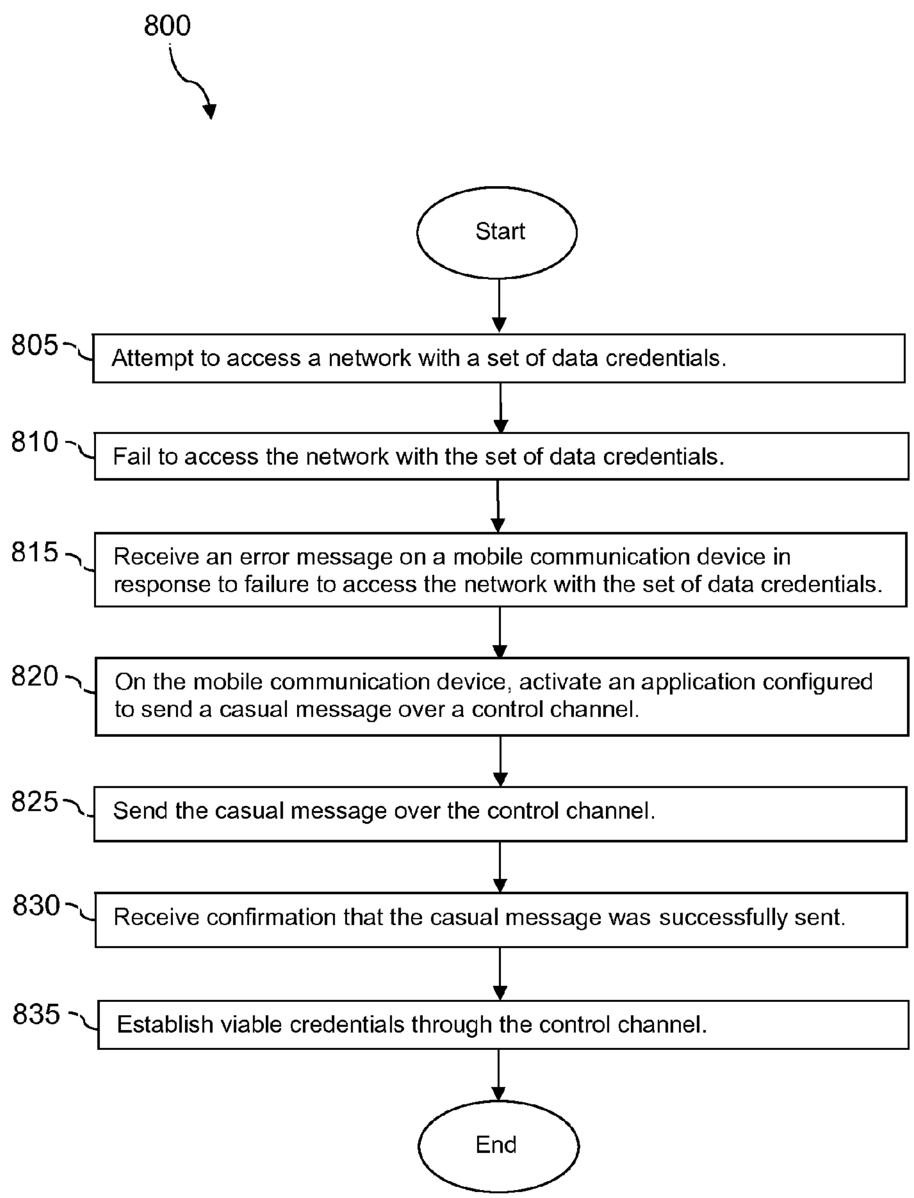
FIG. 5 is a flowchart of a method according to an embodiment of the disclosure.

Referring now to FIG. 5, a method 800 is described. At block 805, an attempt may be made to access a network with a set of data credentials. At block 810, accessing the network may fail based on the set of data credentials. At block 815, an error message may be received by a mobile communication device in response to failure to access the network with the set of data credentials. At block 820, an application may activate on the mobile communication device, which may occur in response to receiving the error message, and the application may be configured to send a casual message over a control channel. In an embodiment, the casual message may be an SMS message sent over an SMS control channel. Alternatively, the casual message may be a different kind of message as described further above. At block 825, the casual message may be sent over the control channel. At block 830, a confirmation that the casual message was successfully sent may be received. At block 835, viable credentials may be established through the control channel. Viable credentials may be active credentials and/or identifiers that allow network access. The mobile communication device may use the control channel to access information stored in the network, stored on a server, stored in a data store, or stored elsewhere. In an embodiment, establishing viable credentials through the control channel may comprise synchronizing credentials in a manner substantially similar to that discussed with reference to FIG. 2 above.

Figure 6:
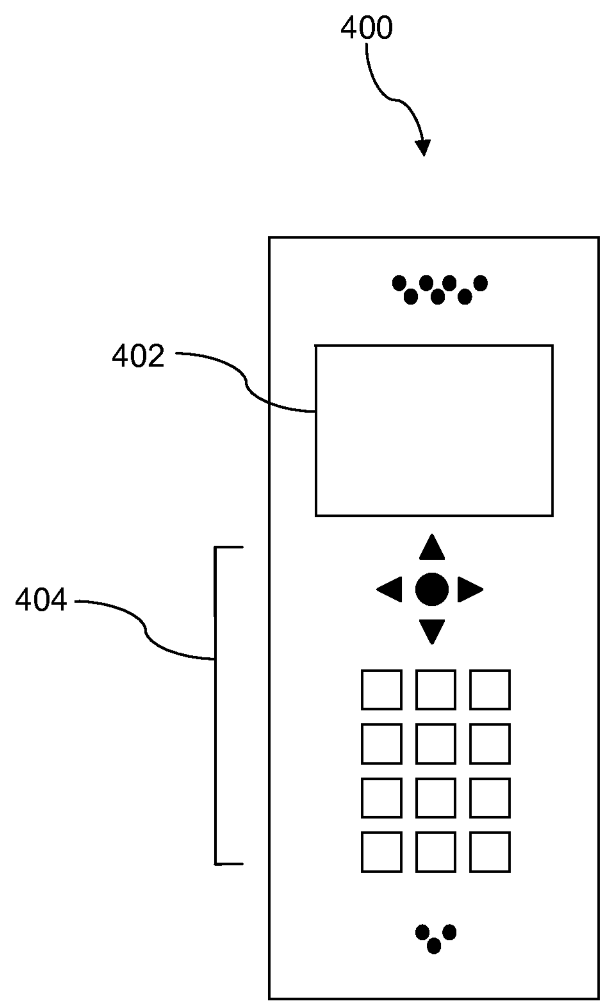
FIG. 6 is an illustration of a mobile device according to an embodiment of the disclosure.

FIG. 6 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 7:
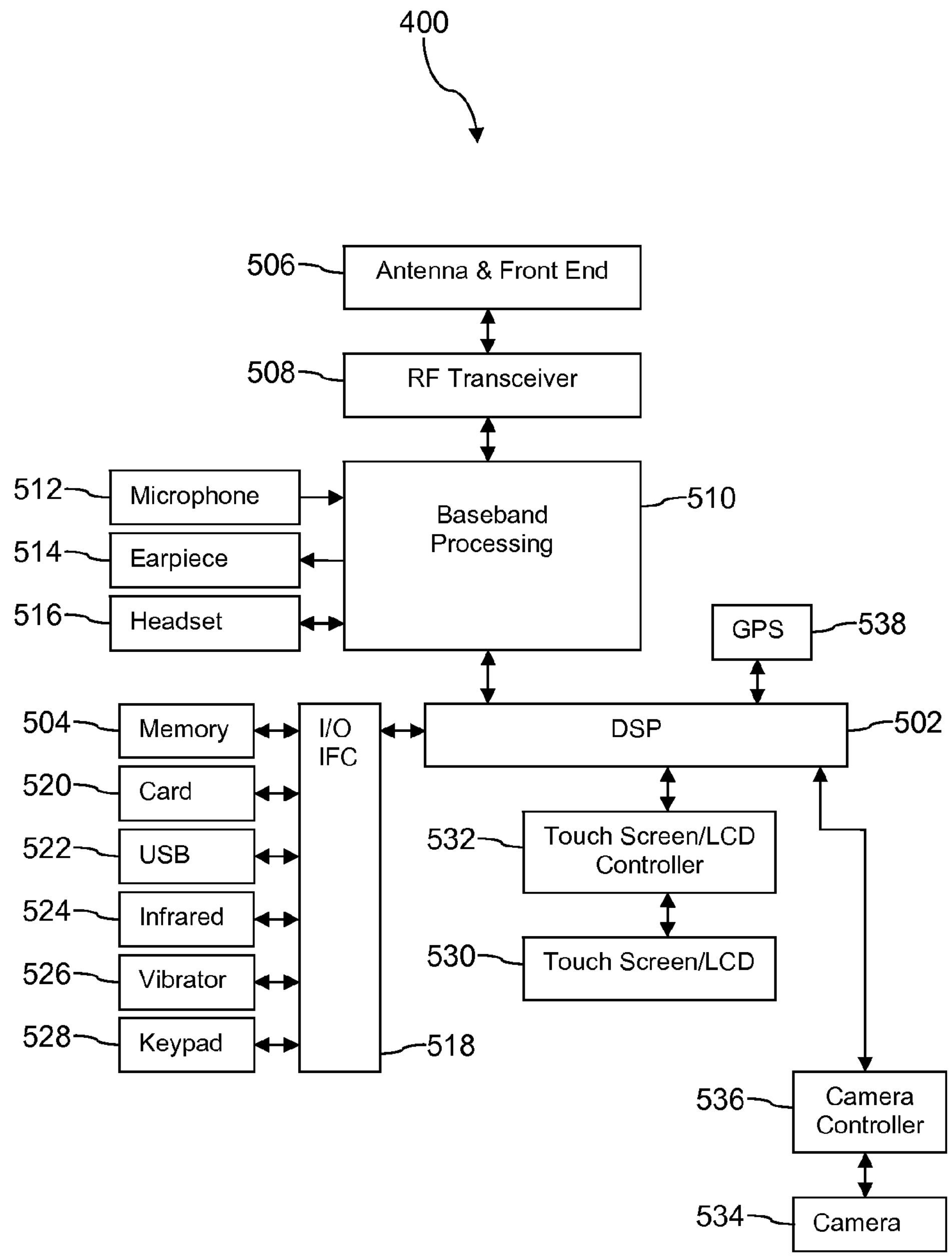
FIG. 7 is a block diagram of a hardware architecture of a mobile device according to an embodiment of the disclosure.

FIG. 7 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 8A:
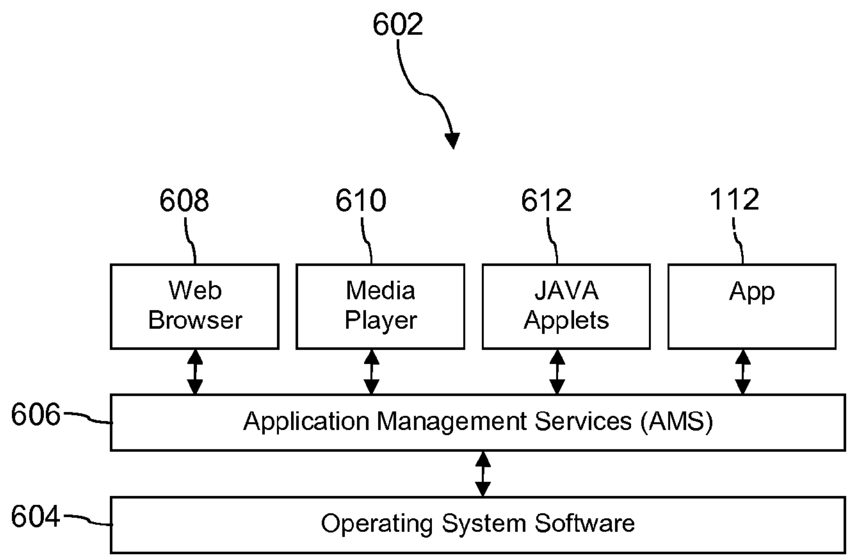
FIG. 8A is a block diagram of a software architecture of a mobile device according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 8A are a web browser application 608, a media player application 610, the application 112, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 8B:
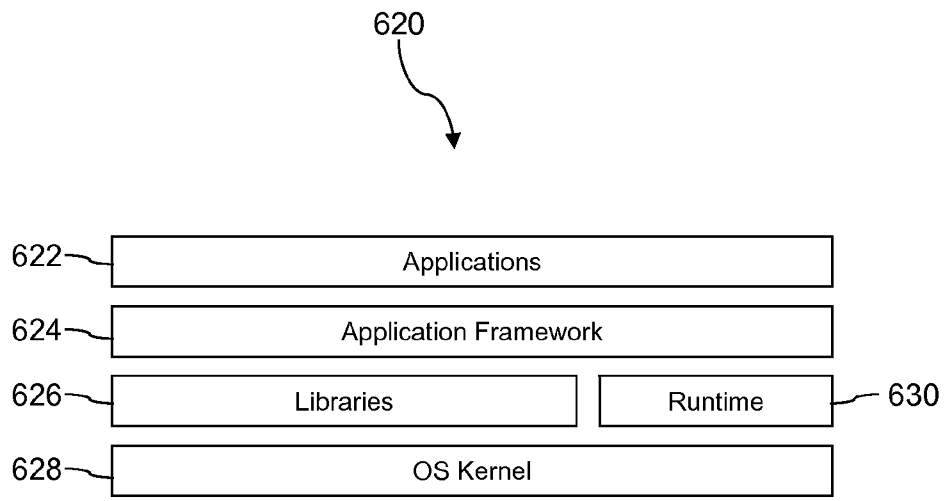
FIG. 8B is a block diagram of another software architecture of a mobile device according to an embodiment of the disclosure.

FIG. 8B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
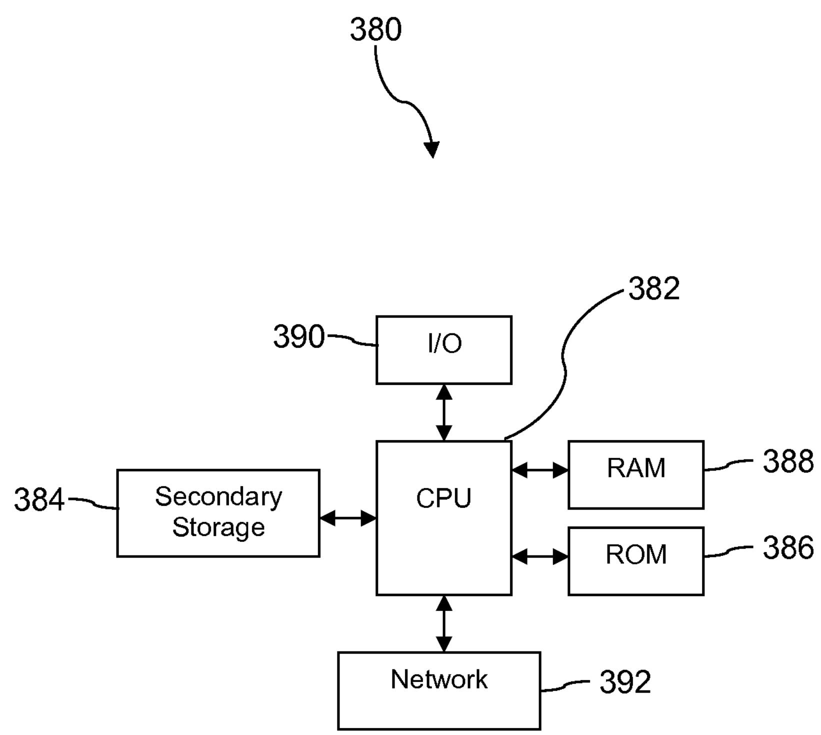
FIG. 9 is a block diagram of a computer system according to an embodiment of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

A mobile communication device that is configured to respond to a network connection failure. The mobile communication device comprising: a cellular transceiver, a digital signal processor, a memory, a computer, an application that, when executed, sends an SMS message from the mobile communication device over an SMS control channel in an attempt to access the network, determines a reason for the network connection failure, and responds based on the reason for the network connection failure.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of responding to a network connection failure in a mobile communication device, the method comprising:

receiving, by a mobile communication device, an error message indicating a data connection failure;

activating an application on the mobile communication device in response to receiving the error message, wherein the application is configured to attempt to access the network using a first identifier;

sending, by the application, an SMS message from the mobile communication device over an SMS control channel in an attempt to access the network;

receiving, by the mobile communication device, information indicating a failure to access the network through the SMS control channel;

determining, by the mobile communication device, that the failure to access the network is based on the first identifier;

performing a limited reset of the mobile communication device, wherein the first identifier on the mobile communication device is replaced with a factory default identifier, and wherein performing the limited reset comprises performing a DSP modem reset configured to allow the application execution to continue after the first identifier has been replaced by the factory default identifier;

confirming, through use of the factory default identifier, that the first identifier is inactive; and establishing the factory default identifier such that the mobile communication device is configured for activation.

2. The method of claim 1, wherein the factory default identifier is a first time identifier applied by a manufacturer.

3. The method of claim 1, wherein the application is configured to attempt to access the network by sending the SMS message.

4. The method of claim 1, wherein activating the application occurs in response to at least one of receipt of the error message or receipt of an input from a user.

5. The method of claim 1, wherein establishing the factory default identifier comprises establishing a factory default setting configured to limit the mobile communication device from attempting to access the network in the factory default state without first receiving activation instructions from an authorized activation application.

6. The method of claim 1, further comprising:

storing the first identifier in a persistent data store in response to determining that the failure to access the network is based on the first identifier.

7. The method of claim 6, further comprising:

deleting the stored first identifier from the persistent data store in response to confirming that the first identifier is inactive.

8. The method of claim 1, wherein establishing the factory default identifier such that the mobile communication device is configured for activation comprises establishing the mobile communication device as a cold device.

9. A method of responding to a network connection failure in a mobile communication device, the method comprising:

receiving, by a mobile communication device, an error message indicating a network connection failure;

activating an application on the mobile communication device, wherein the application is configured to attempt to access the network;

determining, at the mobile communication device, that a first identifier failed to access the network based on the first identifier;

storing the first identifier in a persistent data store;

performing a limited reset, wherein the first identifier on the mobile communication device is replaced with a factory default identifier, and wherein performing the limited reset comprises performing a DSP modem reset configured to allow the application execution to continue after the user identifier has been replaced with the factory default identifier;

attempting to access the network with the factory default identifier;

obtaining access to the network using the factory default identifier;

verifying that the first identifier is active based on obtaining access to the network; and re-establishing the first identifier from the persistent data store.

10. The method of claim 9, wherein the error message indicates a data connection failure.

11. The method of claim 9, further comprising:

attempting, by the application, to access the network via SMS over a voice channel.

12. The method of claim 9, further comprising:

preventing the application from re-executing once the first identifier has been re-established.

13. The method of claim 9, wherein the first identifier is a user MEID.

* * * * *